United States Patent [19]

Heitmann et al.

[11] Patent Number: 4,825,440
[45] Date of Patent: Apr. 25, 1989

[54] SIGNAL ERROR CONCEALMENT CIRCUIT AND METHOD

[75] Inventors: Jürgen Heitmann, Alsbach-Hähnlein, Fed. Rep. of Germany; Peter Wagner, New York, N.Y.

[73] Assignee: Robert Bosch GmbH, Stuttgart, Fed. Rep. of Germany

[21] Appl. No.: 45,692

[22] Filed: Apr. 30, 1987

Related U.S. Application Data

[63] Continuation-in-part of Ser. No. 926,365, Oct. 31, 1986.

[30] Foreign Application Priority Data

Oct. 31, 1985 [DE] Fed. Rep. of Germany ....... 3538735

[51] Int. Cl.$^4$ ............................................. G06F 11/12
[52] U.S. Cl. ......................................... 371/31; 371/38
[58] Field of Search ............................ 371/31, 38, 37; 358/340, 310, 328, 320, 314, 334, 327, 141, 186, 281

[56] References Cited

U.S. PATENT DOCUMENTS

| 4,639,920 | 1/1987 | Kaneko | 371/31 |
| 4,698,811 | 10/1987 | Eto | 371/38 |
| 4,737,863 | 4/1988 | Eto | 358/33 X |
| 4,739,413 | 4/1988 | Meyer | 358/281 |

OTHER PUBLICATIONS

C. D. Mathers, M.Sc., "Digital Video Recording: some experiments in error protection", British Broadcasting Corp. Res. Dept., Jan. 1976, pp. 1-7.

Primary Examiner—Michael R. Fleming
Attorney, Agent, or Firm—Frishauf, Holtz, Goodman & Woodward

[57] ABSTRACT

Two logic circuits (4A, 4B) are utilized in alternation for controlling the processing of successive pixels that are detected to be erroneous. Each logic circuit has its own counter 5A and 5B for associating the undisturbed pixels with ordinal numbers designating their spacing from the disturbed pixel under processing and likewise has a separate PROM (6A, 6B) and a separate multiplier for weighting the undisturbed pixel values, as well as an accumulator (10A, 10B) for summing the weighted values to produce a substitute value, so that undisturbed pixels lying between two disturbed pixels can all be used, where necessary, both for compensating for a preceding disturbed pixel and a following disturbed pixel. When a following disturbed pixel is detected while a preceding disturbed pixel is being processed by a logic circuit, that logic circuit provides a special reset to its counter and accumulator and selects another PROM program in accordance with the shortening of the "filter length" by the nearness of the two disturbed pixels. When no defective pixels appear on the counters, multipliers and accumulators do not need to operate.

8 Claims, 3 Drawing Sheets

SIGNAL ERROR CONCEALMENT CIRCUIT AND METHOD

This application is a continuation-in-part, of application Ser. No. 926,365, filed Oct. 31, 1986.

Cross-Reference is made to related patent application Ser. No. 909,636, filed Sept. 18, 1986, Heitmann.

This invention concerns the kind of error concealment in digital video signals in which when a disturbed digital value representing a pixel (picture element) is detected, a pixel value derived from the values of neighboring pixels is substituted.

Methods and circuits of that kind for concealing errors in digital video signals have become known, for example, from the publication "BBC Research Report", 1976/1, February 1976, pages 1–7. In the method there described, concealment of errors is made in a color television signal that is digitally encoded in a so-called closed code. In this case the derivation of the pixel value to be substituted in place of the disturbed pixel is subject to certain limitations regarding the position of the various pixels relative to the color carrier oscillations. There is the further disadvantage that no symmetrical approximation of the values of neighboring pixels is possible. Connected with these disadvantages, there are additional errors with reference to the time course within a digital video signal of high data rate that is being processed.

It has accordingly also become known to replace a disturbed digital word for a pixel by another digital word by means of transversal filter structures that calculate the replacement value symmetrically from digital words lying on opposite sides of the disturbed digital word, in accordance with a prescribed algorithm in which the formation of averages from oppositely located words is weighted with coefficients that vary with increasing distance from the disturbed word. If 2n undisturbed pixels in n pairs bracketing the disturbed word are utilized for determining the substitute word, a filter structure is necessary that contains the (2n+1) pixels. The apparatus embodiment of such a transversal filter structure involves considerable circuitry expense, since n needs to be made large in the inerest of fitting the substitute word as well as possible to the lost actual value of the disturbed pixel. For example, for a filter length having 21 coefficients, 21 digital multipliers are necessary. These are used, however, only in the case of the disturbance of a pixel for calculating the substituted value. During the rest of the time in which the pixels are undisturbed, which is in general the predominant case, the signal components prepared by means of the multipliers are not needed.

SUMMARY OF THE INVENTION

The present invention makes use of the recognition that is necessary, but also sufficient, to draw upon the neighboring pixels in the same line for providing a substitute value only when an error is found in a pixel. This recognition, according to the invention, leads to an adaptive filter structure that can be embodied in apparatus with substantially smaller circuitry expense.

If in such an adaptive filter there is maintained the requirement of symmetrical interpolation for a disturbed data word, in each case from the neighboring undisturbed data words, the usable filter length for such interpolation is shortened at higher error rates, i.e., in the case of a bunching of the sequence of disturbances. That is because disturbed pixels are reliably excluded from the interpolation operation.

Briefly, when a disturbed pixel appears, a predetermined number of preceding and succeeding undisturbed pixels are provided with corresponding coefficients, and these weighted pixels are written into a filter-accumulator consisting of an addition circuit and a register. The input signal is subjected to a basic delay and when a disturbed value appears for a pixel, the substitute value produced in the filter accumulator is set in its place in the video signal.

The method and apparatus of the invention as just described has the advantage, compared with error concealment with conventional transversal filter structures, that the filter length is fitted to the spacing of errors in the reproduced signal. There is the further advantage that only undisturbed pixels are drawn upon for the interpolation of a substitute value.

It is advantageous for the derived substitute value to be produced, with application of coefficients, out of the largest possible number of symmetrical successive undisturbed pixels by summing the weighted pixels. Furthermore, it is desirable for the number of undisturbed pixels to be drawn upon for producing the substitute value to be determined by the error density in the reproduced signal. For making that determination, it is advantageous to determine the coefficients in a manner dependent upon the original number of undisturbed pixels numbered from the disturbed pixel to an extent limited by the spacing between errors in the reproduced signal. With duplication of only a part of the equipment the same pixels can simultaneously be used for participation in concealment of two different erroneous pixels.

The apparatus arrangements corresponding to the method of the invention are set forth in the detailed description that follows on the basis of which it can be better understood.

BRIEF DESCRIPTION OF THE DRAWINGS

The invention is further described by way of illustrative example with reference to the annexed drawings, in which:

FIG. 1 shows a portion of a television line at the time of processing for concealment of errors in the form of a row of pixels containing a pixel m assumed to be disturbed, a number of undisturbed preceding pixels $m-1$ to $m-n$ and an equally large number of undisturbed succeeding picture points $m+1$ to $m+n$, bracketing the disturbed pixel m. Arrows in FIG. 1 symbolize the interpolation method.

A known method of error concealment is the substitution of a word $m'$ for the disturbed picture point by symmetrical approximation from the words for the undisturbed picture points on both sides of the disturbed picture point m currently being processed. In that known method, an equal number of undisturbed pixels from the part of the line that follows the disturbed word and from the part of the line that precedes the disturbed line are utilized to produce the substitute word with weighting with respective coefficients that vary with the spacing from the pixel currently being processed. In this method, the concealment of the error improves with an increasing number of undisturbed pixels on both sides of the disturbed pixel being drawn upon for calculation of the substitute word.

Conventional transversal filters that are used for error concealment accordingly have a considerable length. The transversal filters are then equipped with a large number of digital multipliers for applying the coefficients. As already mentioned, this involves a great deal of expense for circuits that are operated most of the time in idling condition, i.e., the substitute signal which is continuously being produced is utilized only from time to time, when an error occurs which requires it to be switched into the circuit output. In order to prevent also pulling in other disturbed pixels into the calculation during the processing of heavily disturbed portions of a transmission, thus spoiling the results, special provisions must be made in the known error concealment circuits utilizing conventional filter structures.

Figure 1:
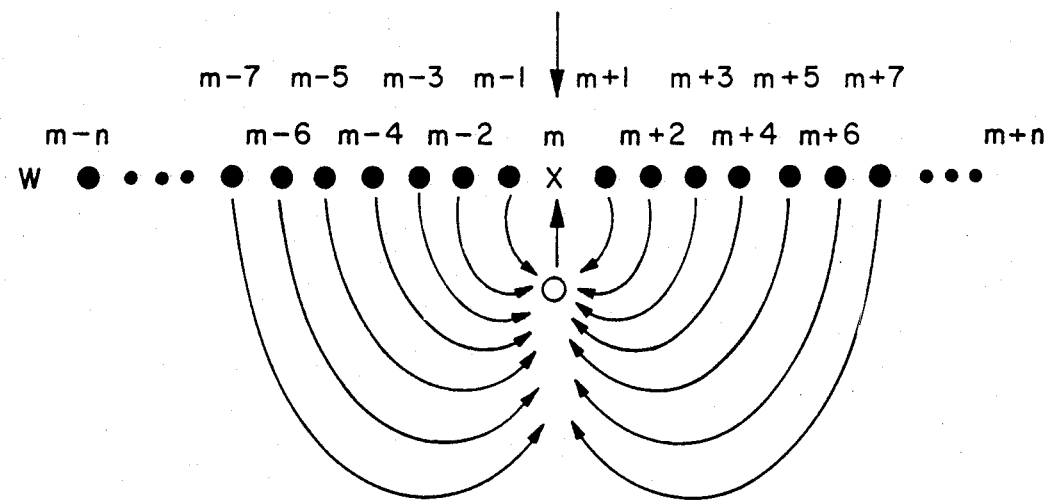
FIG. 1 is a diagram of the known principle of error concealment by symmetrical approximation.
Figure 2:
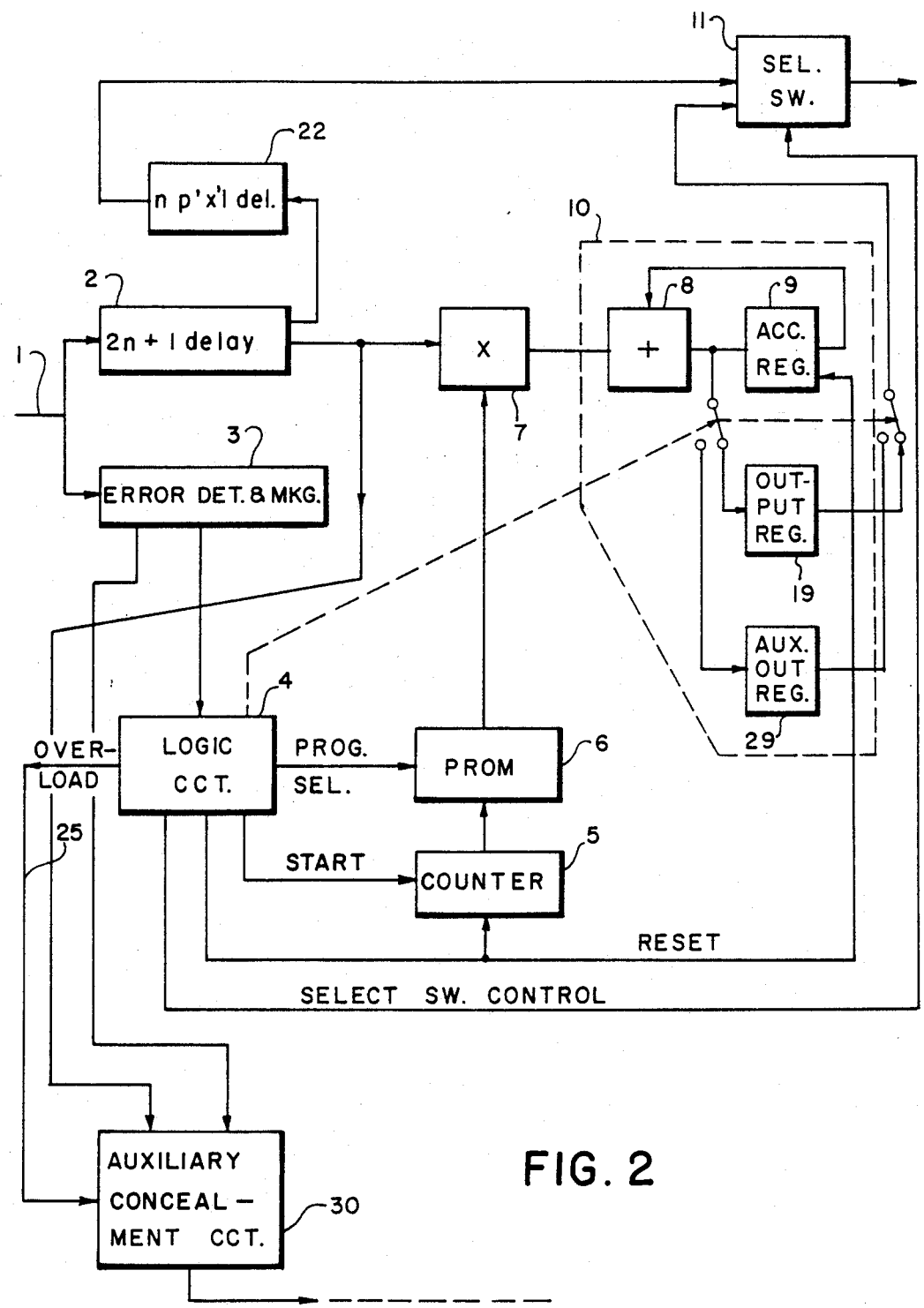
FIG. 2 is a circuit block diagram of an adaptive filter structure for carrying out the method of error concealment explained with reference to FIG. 1.

The circuit arrangement shown in FIG. 2 simplifies the overall operation by performing the weighted averaging operation only for as many undisturbed pixels as appear in uninterrupted sequence on both sides of the disturbed pixel being processed. The arriving signal 1 in FIG. 2, representing a continuing sequence of pixels representing the picture content, is subjected to a delay equal to the maximum filter propagation time, $2n+1$ pixel intervals, (see FIGS. 1 and 3) in the first delay unit 2 and then is delayed further by n pixel intervals in a second delay unit 22. While the signals are being subjected to delay, the signal input 1 is examined for errors in the error recognition and marking stage 3 according to defined criteria. Errors are marked by setting the pixel value to zero. A logic circuit 4 is alerted when an error appears and starts a counter as soon as the nth pixel following that erroneous pixel has been examined. The counter 5 can, for example, be a programmable counter for providing as an output the ordinal number of each undisturbed pixel in the sequence with reference to the erroneous pixel recognized in the error recognition circuit 3, this being done both for the preceding pixels, as well as for the succeeding pixels. The procedure for the situation of FIG. 1 will first be described.

In response to the counter, coefficients are called out of the coefficient memory 6 which for example can be a programmable read-only memory (PROM) that provides the appropriate coefficient for every pixel in accordance with its spacing from a disturbed pixel currently being processed. The coefficients called out of the PROM 6 are multiplied with the corresponding pixel values in the multiplier stage 7, which means that the pixels are thus weighted in a manner corresponding to the above-mentioned ordinal numbers. The individual products resulting from this weighting process and, hence, the weighted words for the undisturbed pixels symmetrically located on both sides of the disturbed pixel are supplied to an addition stage 8 which, together with the registers 9 and 19, forms a so-called accumulator 10. There the weighted undisturbed pixels are added until the symmetry requirement is fulfilled, and a substitute value for the disturbed pixel m, which is as exact as possible, is produced. The logic circuit 4 then actuates the switchover circuit 11 in such a way that upon the appearance of the disturbed pixel m from the output of the second delay stage 22, the substitute value stored in the accumulator 10 is switched into the signal in place of the disturbed pixel m.

Figure 3:
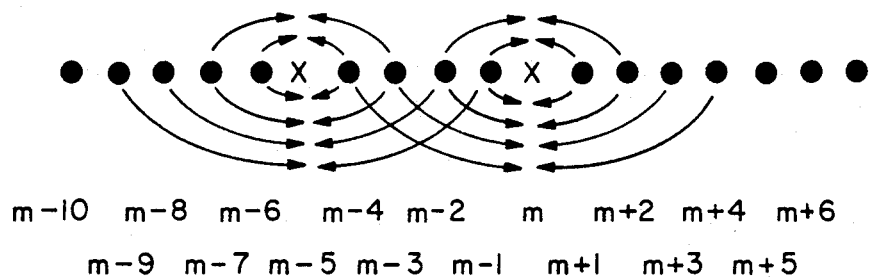
FIG. 3 is a diagram of the principle of symmetrical overlapping approximation in cases of higher error rate of the reproduced video signal.

As already mentioned, in the reproduction of digital video signals, error bunching in highly disturbed signal sequences can be so great that fewer undisturbed pixels can be drawn upon for weighted averaging than the number of pixels that can be accommodated by the filter length. Such a case is illustrated in FIG. 3 in which both the pixel m and the pixel m−5 are recognized as erroneous.

Because of the symmetry condition that is to be maintained, there are only two undisturbed pixels available for averaging both in the case of the pixel m and in the case of the pixel m−5. This situation is illustrated in the portion of FIG. 3 above the row of pixels of the line being processed. With respect to the circuit of FIG. 2, this signifies that the counter 5 can be available for forming averages of another disturbed pixel only when the previous processing of averaging is completed and the partial results are loaded in the accumulator. This means that the filter according to the circuit of FIG. 2 must fit the error rate and the logic circuit 4 must cut off the processing of m at (m−2, m+2) after the error in m−5 is detected.

When the error in pixel m−5 is detected, the logic circuit then splits the sequence m−1 to m−4 to allocate a first portion to m and the rest to m−5. This it does by selecting a program of the PROM 6 that will give zero weight to pixels m+6, m+5, m+4 and m+3. (If there had been 5 intervening pixels, it would have allocated the third one to m.) The logic circuit at the same time provides for resetting the counter 5 and the accumulator register 9 after the product corresponding to pixel m−2 is entered and switching in an auxiliary output register 29 for the brief processing of the erroneous pixel m−5 beginning with a product formed from m−3.

When a third erroneous pixel is detected within a sequence of $2n+1$ pixels which the counter 5 would normally have counted out for processing a first erroneous pixel, the logic circuit of FIG. 2 produces an overload signal on line 25 to call in a more elaborate concealment processing unit 30 taking account, in an already known way, of pixel pairs bracketing the erroneous pixel vertically or diagonally in the previous picture field, for example.

As above mentioned, it is desirable for the weighted averaging to include as many as possible of the undisturbed pixels on both sides of the disturbed pixel which is currently to be concealed, for, in order to obtain concealment that is as good as possible. In the example shown in FIG. 3, therefore, four pixels in each case on both sides of the disturbed pixels m and m−5 ought to be drawn upon for weighted averaging, as is shown symbolically in the lower half of FIG. 3 by corresponding arrows. As can there be seen, the pixels lying between the two disturbed pixels m and m−5, namely the pixels m−1 through m−4, should be brought into weighted averaging in both cases, both for the disturbed pixel m and for the disturbed pixel m−5.

The tables given below set forth illustrative examples of sets of coefficients for storage in the PROM 6 or multiplication with the corresponding pixel values in the multiplier stage 7, as above-described. There are tabulated below two different illustrative sets of coefficients for each of four different filter lengths. Two sets are provided for each illustrated filter length in order to illustrate that there is no universal rule for determining these coefficients, but that a variety of ways of setting the coefficient values may be suitable and that the principles that are applicable are known in the art. It should further be added, that it is possible to have sets of coefficients for the purpose here involved in which all of the coefficients have the same sign. All suitable sets will have the absolute magnitude of the coefficients declining as the pixel positions become farther removed from the erroneous pixel for which a substitute value is to be calculated.

| FOR FILTER LENGTH = 11: | | |
|---|---|---|
| Ordinal No. of Coefficient | Example I Coefficient | Example II Coefficient |
| 1 | 0.226 | 0.228 |
| 2 | −0.430 | −0.430 |
| 3 | 0.602 | 0.602 |
| 4 | −0.830 | −0.830 |
| 5 | 0.930 | 0.930 |
| 6 | 0.0 | 0.0 |
| 7 | 0.930 | 0.930 |
| 8 | −0.830 | −0.830 |
| 9 | 0.602 | 0.602 |
| 10 | −0.430 | −0.430 |
| 11 | 0.226 | 0.228 |

| EXAMPLES OF FILTERS OF OTHER LENGTHS (L) | | | | | |
|---|---|---|---|---|---|
| Ordinal Number of Coefficients | L = 13 Coeff. | L = 9 Coeff. | L = 7 Coeff. | L = 5 Coeff. | L = 5 Coeff. |
| 1 | −0.078 | | 0.1 | −0.1 | 0.5 |
| 2 | +0.195 | −0.1 | −0.3 | 0.6 | 0.0 |
| 3 | −0.367 | 0.4 | 0.7 | 0.0 | 0.5 |
| 4 | +0.586 | −0.6 | 0.0 | 0.6 | |
| 5 | −0.789 | 0.8 | 0.7 | −0.1 | |
| 6 | +0.953 | 0.0 | −0.3 | | |
| 7 | 0 | 0.8 | 0.1 | | |
| 8 | +0.953 | −0.6 | — | | |
| 9 | −0.789 | 0.4 | | | |
| 10 | +0.586 | −0.1 | 0 | 0 | 0 |
| 11 | −0.367 | 0 | 0 | 0 | 0 |
| 12 | +0.195 | | | | |
| 13 | −0.078 | | | | |

It is desirable for the PROM 6 of FIG. 2 to store sets of coefficients for various filter lengths, so when the detection of a second erroneous pixel following fairly closely after a first erroneous pixel requires the shortening of the filter length, the PROM 6 can adjust not only the filter length but also the coefficients within the span of the shorter filter length. The delays provided in the system can always be made sufficient to accommodate the longest filter length that the circuit designer chooses to use.

Figure 4:
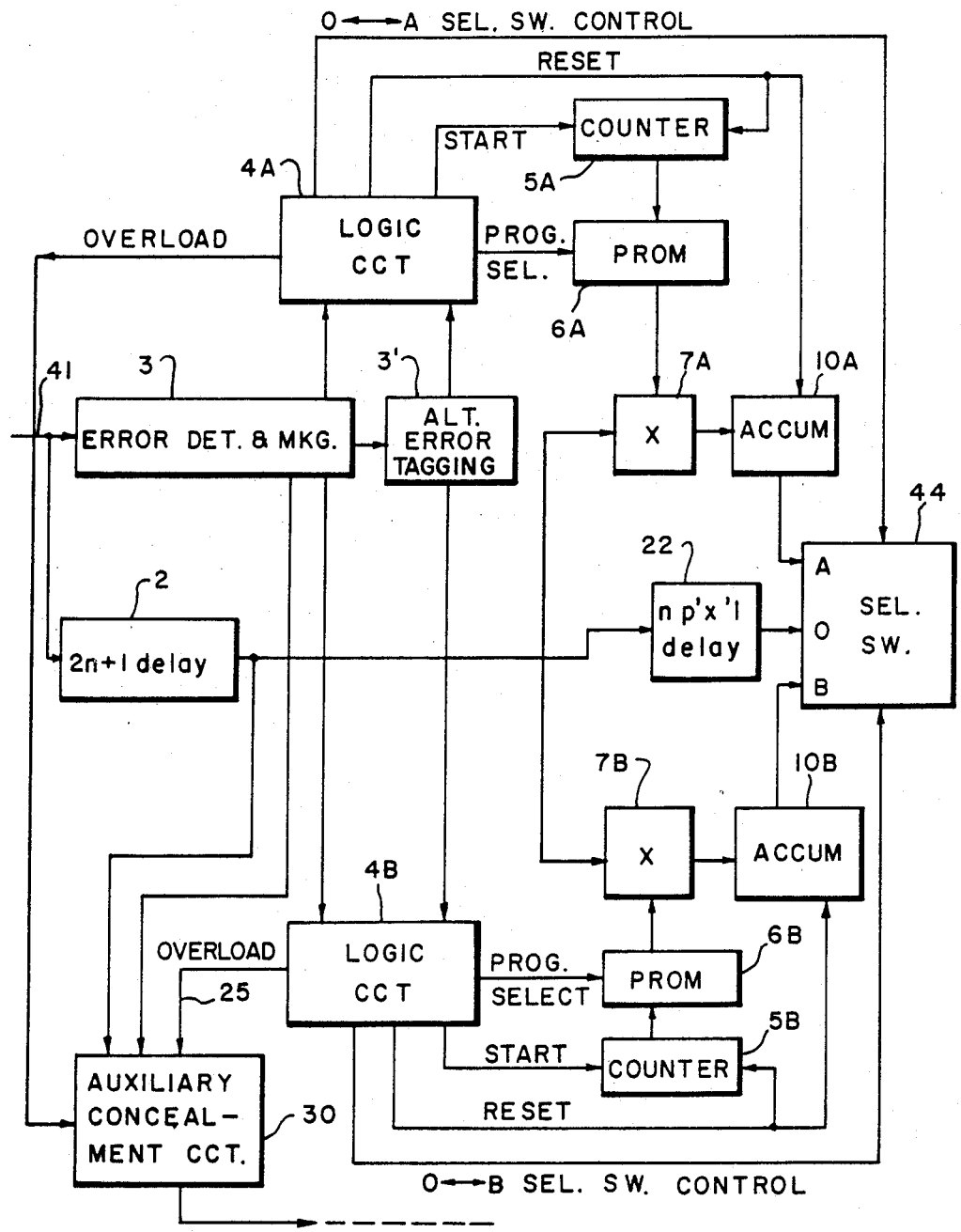
FIG. 4 is a block circuit diagram of a modified filter structure for carrying out the error concealment method illustrated in FIG. 3.

FIG. 4 shows in greatly simplified form a block circuit diagram for carrying out the kind of error compensation method described with reference to FIG. 3. The circuit of FIG. 4 basically corresponds to a dual filter structure according to FIG. 2 with a common input stage for error recognition and input signal delays and a common switch for the insertion of the substituted value stored in the accumulator in place of a disturbed pixel currently processed for concealment.

The function of the circuit block elements shown in FIG. 4 corresponds essentially to the function of the circuit parts functionally shown in FIG. 2. For that reason, the circuit blocks are provided with the same numerical designations as in FIG. 2 with a suffix A for the upper branch and B for the lower branch shown in FIG. 4.

The input signal presented at 41 is first prepared for processing in error recognition circuits 3 and 3A and in the delay circuits 2 and 22 for both branches that are now to be described. Errors in the transmitted signal effect the two logic circuits 4A and 4B in such a way that the errors are alternately processed by the circuit branch A (upper half of the overall circuit) and circuit branch B (lower half of the overall circuit). For this purpose, the errors are "tagged" in the circuit 3' for alternate activation of the logic circuits 4A and 4B to process them. The counters 5A and 5B can therefore make use in an overlapping manner of the same undisturbed pixels for averaging for different erroneous pixels and thus improve the degree of error concealment.

In the case of FIG. 4, in the processing of a first eroneous pixel value by the logic circuit 4A which is followed within n subsequent pixels by an erroneous pixel value procesed by the logic circuit 4B, n+1 pixels can be counted out by both of the respective counters 5A and 5B, with the programs of the memories 6A and 6B being selected to set to zero the weights of the appropriate "excluded" pixels. The accumulators 10A and 10B need only one output register each. An overflow signal can be given by a logic circuit whenever its counter is still counting at a time when the detector circuits 3 and 3A assign a newly detected erroneous pixel to that same logic circuit for processing.

At the end of the counting, multiplying and accumulating for an erroneous pixel by either branch A or branch B of FIG. 4, the erroneous pixel appears at the output of the delay circuit 22. The logic circuit, 4A or 4B as the case may be, then operates the selector switch 44 to substitute the output of the corresponding accumulator, 10A or 10B as the case may be, for the erroneous pixel.

The selector switch 44 is distinguished from the switching device 11 of FIG. 2 in having three switch positions that make it possible to select between an undisturbed delayed signal on the line 45 and alternately one of the signals of the respective outputs of the accumulators 10A and 10B. At the output of the selector switch 44 there is then the error compensated output signal.

The error concealment circuits and method of invention are well suited for use in overall processing of digital color television signals obtained by digitizing signal reproduced from a magnetic tape record such as are disclosed in U.S. patent application Ser. No. 908,636, filed Sept. 18, 1986.

The method and apparatus of the invention can adequately process erroneous pixels near the edges of the displayed picture because the scanning pattern normally provides some extra pixels beyond what appears in the picture tube screen. Low pass-filtering (to 5.5 mHz) of the analog video signal before A/D conversion contributes considerably to effectiveness of processing for concealment errors according to the invention; which makes such processing, when available, superior to what can be done in the known auxiliary processor 30 that is used when the system of the invention is overloaded by bunched errors. The occasional switching in of the output of the auxiliary processing circuit 30 is not shown in FIGS. 2 and 4 in order to simplify the drawing. This function can be combined into selector switch 11 of FIG. 2 or the selector switch 44 of FIG. 4.

Although the invention has been described with reference to a particular illustrative example, it will be recognized that modifications and variations are possible within the inventive concept.

We claim:

1. Method of compensating errors in digitally coded video signals comprising the steps of:
   supplying digitally coded video signals simultaneously to a pixel value error detector and to a first delay circuit;
   delaying said video signals in said first delay circuit by a first time interval the duration of which depends upon a predetermined maximum number of pixels of a television line symmetrically bracketing an erroneous pixel which may be required for deriving a replacement pixel value for an erroneous pixel value;
   detecting pixel value errors of said video signals in said pixel value error detector;
   whenever an erroneous pixel is detected by said pixel value error detector, activating a counter for denominating each undisturbed pixel value appearing at the output of said first delay circuit with a numerical ordinate pixel designation with respect to said erroneous pixel value;
   addressing a weighting factor memory with said numerical ordinate pixel designations to obtain respective matching weighting factors for each of said undisturbed pixel values;
   multiplying said undisturbed pixel values by their corresponding matching weighting factors to obtain weighted product values;
   summing said weighted product values to produce a substitute pixel value;
   delaying the output of said first delay circuit by a second time interval equal to an integral number of pixel intervals (n) which is less than half said first time interval by no more than half a pixel interval, and
   switching in said substitute pixel value in the plane of said erroneous pixel value when said erroneous pixel value appears in the output of said second delay circuit.

2. Method according to claim 1, in which a weighted product obtained by multiplying a first undisturbed pixel value by its matching weighting factor obtained from said weighting factor memory is used in the summing of weighted products only if there is a second weighted product produced by multiplication of the same weighting factor by the value of a second undisturbed pixel in a symmetrical location relative to said erroneous pixel value, and if no such weighted product is available because of the absence of an undisturbed pixel in said symmetrical location, the weighting multiplier of said first undisturbed pixel is set to zero and all pixel values which would be multiplied by smaller weighting values are excluded from the summing step, by setting their weighting multiplier to zero.

3. Method according to claim 2, in which when a second erroneous pixel is subsequently detected within said predetermined maximum number of pixels bracketing a first detected erroneous pixel, the weighted products summed to produce the substitute pixel value for the first detected erroneous pixel are limited to a number of pairs of equally weighted pixel values which is either half or a bare majority of the number of undisturbed pixels located between said first and second erroneous pixels.

4. Method according to claim 1, in which after a second erroneous pixel is subsequently detected within said predetermined maximum number of pixel values bracketing a first detected erroneous pixel, the processing operations of denominating, memory addressing and multiplying related to said first erroneous pixel are discontinued and new processing operations of denominating, memory addressing, multiplying and summing of the same kind are begun for producing a substitute pixel value for said second erroneous pixel utilizing, among other undisturbed pixel values, the values of all undisturbed pixels intervening between said first and second detected erroneous pixels, values of said intervening undisturbed pixels being weighted and accumulated for producing respective substitute pixel values for both said erroneous pixels by concurrently overlapping processing.

5. Apparatus for concealing errors in digitally coded video signals comprising:
   a pixel value error detector for identifying and marking an erroneous pixel value in a television line of pixel values of digitally coded digital video signals;
   a first delay circuit for delaying digitally coded video signals and means for connecting said pixel value error detector and said first delay circuit to the same source of digitally coded video signals for simultaneous reception thereof, said delay circuit providing a first delay interval $(2n+1)$ dependent upon a predetermined maximum number $(2n)$ of pixels of a television line symmetrically bracketing an erroneous pixel which may be required for deriving a replacement pixel value for an erroneous pixel value;
   a counter connected for activation in response to an output of said pixel value error detector for associating undisturbed pixel values both preceding and succeeding an erroneous pixel value, in uninterrupted succession, with an ordinate number designating the pixel interval count of the time spacing of the undisturbed pixel value from said erroneous pixel value for undisturbed pixel values within said maximum number of pixels;
   a programmable weighting coefficient memory addressable by said ordinate values for associating each said undisturbed pixel with a weighting factor;
   a multiplier for multiplying each said undisturbed pixel value by the weighting factor provided therefor by said programmable memory to produce weighted product values corresponding to said undisturbed pixel values, said multiplier having one input connected to the output of said first delay circuit and a second input connected to an output of said memory;
   an accumulator for summing the product values produced by said multiplier;
   a second delay circuit having its input connected to the output of said first delay circuit for producing a second delay interval equal to an integral number (n) of pixel intervals which is not more than half said first time interval and does not fall short of half of said first time interval by as much as an entire pixel interval;
   switching means having a first input connected to the output of said accumulator and a second input connected to the output of said second delay circuit for substituting the output of said accumulator for said erroneous pixel value;

logic circuit means for controlling said counter, coefficient memory, accumulator and switching means, said logic means being connected for activation in response to said pixel value error detector; and means in said logic circuit means responsive, during control of said counter, memory and accumulator for preparing an accumulator output for substitution for a first erroneous pixel value, to detection by said error detector of a second erroneous pixel value, for selecting a program for said memory for reducing the number of values of pixels symmetrically bracketing said first erroneous pixel value to be multiplied by nonzero coefficients in said multiplier.

6. Apparatus according to claim 5, wherein said program selecting means of said logic circuit means and said programmable memory are so constituted that in response to said detection of said second erroneous pixel value the program selected for said memory reduces said number of symmetrically bracketing pixel values sufficiently, if possible, to allocate at least one undisturbed pixel value preceding said second erroneous pixel value for processing a replacement pixel value for substitution in place of said second erroneous pixel value, and said logic circuit in such case being equipped for thereafter causing said counter, memory, accumulator and switching means to process at least one pair of undisturbed pixel values, if available, bracketing said second erroneous pixel value for producing and inserting said replacement pixel value in substitution for said second erroneous pixel value.

7. Apparatus for compensating errors in digitally coded video signals comprising:

a pixel value error detector for identifying and marking an erroneous pixel value in a television line of pixel values of digitally coded digital video signals;

a first delay circuit for delaying digitally coded video signals and means for connecting said pixel value error detector and said first delay circuit to the same source of digitally coded video signals for simultaneous reception thereof, said delay circuit providing a first delay interval $(2n+1)$ dependent upon a predetermined maximum number $(2n)$ of pixels of a television line symmetrically bracketing an erroneous pixel which may be required for deriving a replacement pixel value for an erroneous pixel value;

first and second logic circuit means for respectively controlling first and second counter, first and second coefficient memories, first and second multipliers, first and second accumulators and switching means hereinafter specified, said first and second logic means being connected for activation in response to respective outputs of said pixel value error detector, said pixel value error detector also including means for designating erroneous pixel values for alternate processing for determination of replacement pixel values therefor respectively by said first and second logic circuit means;

a first counter connected for activation by said first logic circuit means in response to an output of said pixel value error detector designated for processing by said first logic circuit means for associating undisturbed pixel values both preceding and succeeding an erroneous pixel value in uninterrupted succession, with an ordinate number designating the pixel interval count of the time spacing of the undisturbed pixel value from erroneous pixel value for undisturbed pixel values within said maximum number of pixels;

a first programmable weighting coefficient memory addressable by said ordinate values determined by said first counter for associating each said undisturbed pixel value with a weighting factor;

a first multiplier for multiplying each said undisturbed pixel value by the weighting factor provided therefor by said first programmable memory to produce weighted product values corresponding to said undisturbed pixel values, said multiplier having one input connected to the output of said first delay circuit and a second input connected to an output of said first memory;

a first accumulator for summing the product values produced by said first multiplier;

a second counter connected for activation by said second logic circuit means in response to an output of said pixel value error detector with designation of said second logic circuit means for processing for associating undisturbed pixel values both preceding and succeeding an erroneous pixel value, in uninterrupted succession, with an ordinate number designating the pixel interval count of the time spacing of the undisturbed pixel value from said erroneous pixel value for undisturbed pixel values within said maximum number of pixels;

a second programmable weighting coefficient memory addressable by said ordinate values from said second counter for associating each said undisturbed pixel value with a weighting factor;

a second multiplier for multiplying each said undisturbed pixel value by the weighting factor provided therefor by said second programmable memory to produce second weighted product values corresponding to said undisturbed pixel values, said second multiplier having one input connected to the output of said first delay circuit and a second input connected to an output of said second memory;

a second accumulator for summing the product values produced by said second multiplier;

means in said first logic circuit means responsive, during control of said first counter, first memory and first accumulator, for preparing an output of said first accumulator for substitution for an erroneous pixel value, to detection by said error detector of a following erroneous pixel value, said following erroneous pixel value being designated for processing by said second logic circuit means, for selecting a program for said first programmable memory whereby the span of pixels bracketing said erroneous pixel value processed by said first logic circuit means for weighting by said first memory with nonzero coefficients is shortened to fall short of said following erroneous pixel value designated for processing by said second logic circuit means;

means in said second logic circuit means responsive, during control of said second counter, second memory and second accumulator, for preparing an accumulator output for substitution for an erroneous pixel value, to detection by said error detector of a following erroneous pixel value, said following pixel value being designated for processing by said first logic circuit means, for selecting a program for said second programmable memory whereby the span of pixels bracketing said erroneous pixel value processed by said second logic circuit means for weighting by said second memory with nonzero coefficients is shortened to fall short of said following erroneous pixel value designated for processing by said first logic means;

a second delay circuit having its input connected to the output of said first delay circuit for producing a second delay interval equal to an equal number (n) of pixel intervals which is not more than half said first time interval and does not fall short of half of said first time interval by as much as an entire pixel interval, and switching means, having a first input connected to the output of said first accumulator, a second input connected to the output of said second delay circuit and a third input connected to the output of said second accumulator for substituting the output of said first accumulator in response to said first logic circuit for replacement of an erroneous pixel value appearing at the output of said second delay circuit, for substituting the output of said second accumulator in response to said second logic circuit for replacement of an erroneous pixel value appearing at the output of said second delay circuit and for allowing passage of undisturbed pixel values appearing at the output of said second delay circuit for further processing.

8. Apparatus according to claim 7 further comprising auxiliary error concealing means utilizing pixel value information from television lines bracketing the television line in which an erroneous pixel to be concealed appears and also comprising means in said first logic circuit means and likewise in said second logic circuit means for producing an overload signal at an overload output when a third erroneous pixel is detected by said error detector within the said predetermined maximum number of bracketing pixels symmetrically bracketing an erroneous pixel previously designated for processing the particular one of said first and second logic means, said auxiliary error concealing means being connected to said overload outputs of said respective logic circuit means, to an output of said first delay circuit and to and output of said error detector.

* * * * *